(No Model.) 3 Sheets—Sheet 1.
D. L. ZACH.
ROOF OR COVER FASTENING DEVICE FOR LUMBER PILES.

No. 558,139. Patented Apr. 14, 1896.

Witnesses:
Ada Waters
G. R. Monks Jr.

Duane L. Zach
Inventor.
By John A. Gregg
Attorney.

(No Model.) 3 Sheets—Sheet 2.

D. L. ZACH.
ROOF OR COVER FASTENING DEVICE FOR LUMBER PILES.

No. 558,139. Patented Apr. 14, 1896.

Witnesses:
Ada Waters
G. R. Monks Jr.

Durand L Zach
Inventor.
by John A Gregg
Attorney.

(No Model.) 3 Sheets—Sheet 3.
D. L. ZACH.
ROOF OR COVER FASTENING DEVICE FOR LUMBER PILES.
No. 558,139. Patented Apr. 14, 1896.
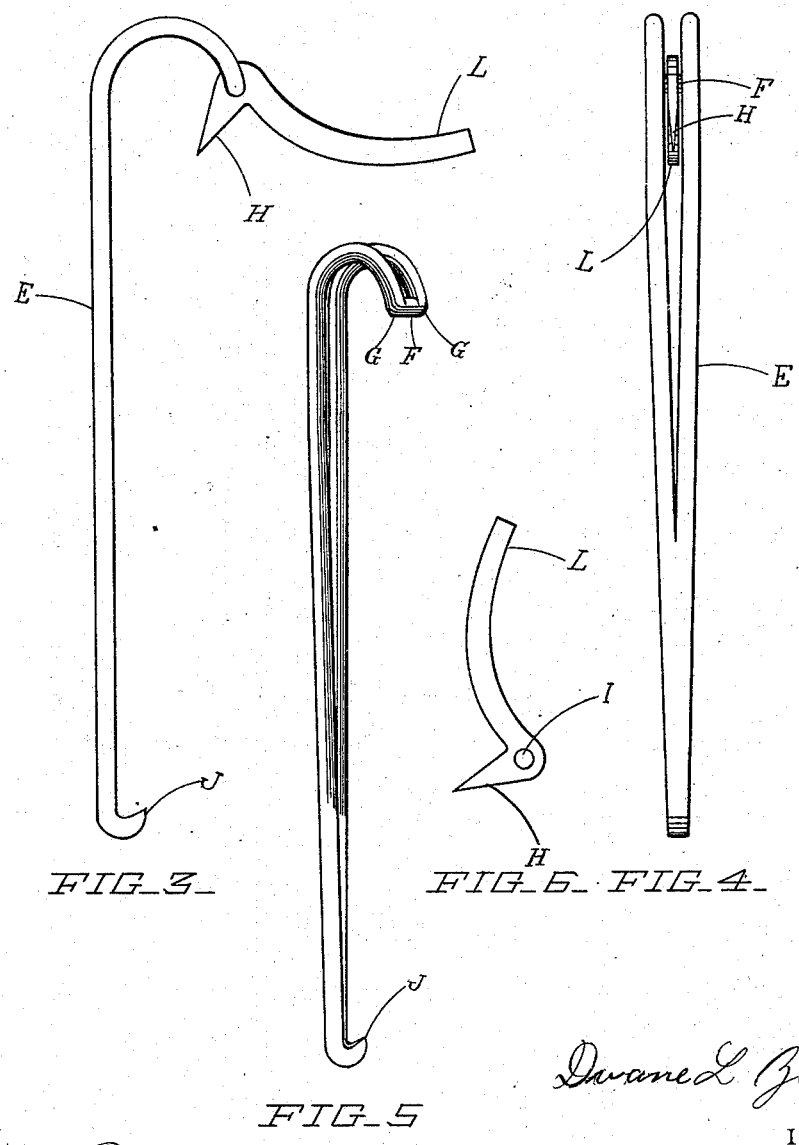

UNITED STATES PATENT OFFICE.

DUANE L. ZACH, OF BAY CITY, MICHIGAN.

ROOF OR COVER FASTENING DEVICE FOR LUMBER-PILES.

SPECIFICATION forming part of Letters Patent No. 558,139, dated April 14, 1896.

Application filed August 12, 1895. Serial No. 559,010. (No model.)

*To all whom it may concern:*

Be it known that I, DUANE L. ZACH, a citizen of the United States, residing at Bay City, in the county of Bay and State of Michigan, have invented certain new and useful Improvements in a Roof or Cover Fastening Device for Lumber-Piles; and I do hereby declare the following to be a full, clear, and exact description of the invention, such as will enable others skilled in the art to which it appertains to make and use the same.

My invention relates to improvements in a device for clamping and fastening the roof or cover on a lumber-pile; and it consists in the combination, arrangement, and construction of the parts, with the object of producing a device for fastening the roof or cover on lumber-piles that will firmly secure the cover to the top of the lumber-pile, with the object of preventing it from being blown off or deranged by the wind or stormy weather, by means of braces projecting down the side of the lumber-pile provided with a hook on the lower end to hook under the outside boards and a dog provided on the upper end to clamp down and firmly fasten the roof or cover in its place.

Another object of the invention is to construct a light and desirable device for clamping and securing the roof or cover of a lumber-pile in place that will dispense with the exorbitant expense of time and labor for stripping, wiring, and tying the roof or cover on a lumber-pile which, while being effective, quick, and easy to manipulate, is at the same time simple and cheap in its design and manufacture.

My improved fastening device for lumber-pile roofs or covers is illustrated in the accompanying drawings, in which the same letters of reference will be found indicating the same parts or elements throughout the several illustrations.

Figure 1:
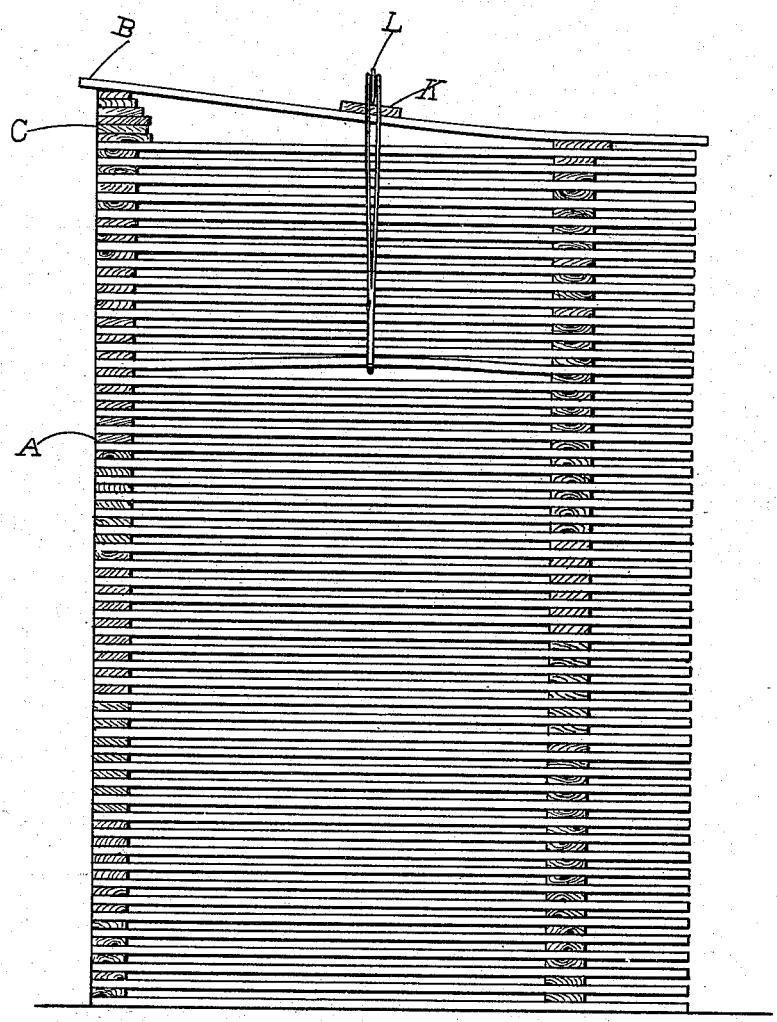
Figure 2:
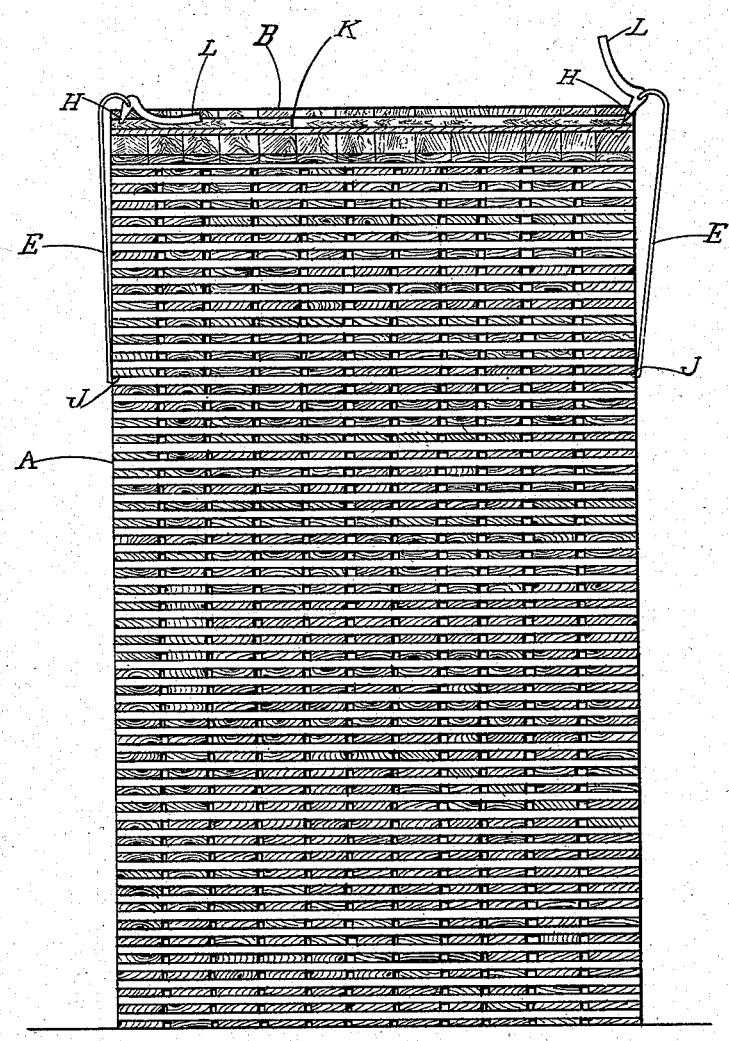

Figure 1 is a perspective side view of a lumber-pile, showing the device as applied to the lumber-pile when clamping and holding the roof or cover in position. Fig. 2 is a back or rear view of the same, showing the position of the left-hand dog when it is clamped down on the roof or cover and securing it to the lumber-pile. The right-hand dog is left unclamped for the purpose of showing its position open and unclamped from the roof or cover. Fig. 3 is a side perspective view of the device, and Fig. 4 is a front view of the same. Fig. 5 represents the brace, and Fig. 6 is the dog.

A represents the lumber-pile, and B is its roof or cover.

C are boards laid on top of each other for the purpose of elevating the front end of the roof or cover B, whereby the lumber-pile is sheltered from rain and falling weather. The lumber-piles are shown expressly for the purpose of illustrating my invention.

E is the brace, bifurcated and provided with a curved hook on its upper end, with its prongs connected and forming square corners at G G and its lower end provided with a hook at J.

H represents the dog, provided with a hole at I and a curved handle L. The dog H is journaled to the upper end of the bifurcated brace E by means of the cross-bar F, that connects the square corners G G and the hole I, formed in the said dog H, whereby it rotates between the prongs of the bifurcated brace E. This brace E projects down the side of the lumber-pile A to a suitable distance, determined by and dependent upon the length of the brace E, with the curve provided on the upper end of the said brace resting on a board K, placed across the center of the roof B. The dog H is revolved back and between the prongs of the bifurcated brace E. The hook J is then hooked under one of the outside boards of the lumber-pile A, where it firmly secures its hold. The handle L is then rotated back in the opposite direction from the brace E, whereby the dog H revolves down on the board K, presses the roof or cover down, and firmly holds it in position, and when releasing the fasteners it is only necessary to revolve the handle L in the direction of the brace E, whereby the point of the dog is turned upward and the board K released, whereby the cover B is released and the roof or cover easily removed.

It will be noticed that the point of the dog H forms an obtuse angle with its handle L, whereby the center of compression from the brace E is between the dog's point and its handle L, which forms a brace that securely holds it in position and can only be released by revolving the handle L toward the bifurcated brace E. It will also be noticed that the curve formed in the handle L provides means for easily catching hold with a person's hands, whereby a person is not obliged to squeeze his fingers between the handle and the boards when releasing the fastener from the roof or cover of the lumber-pile, and that any desired number of fasteners may be used as may be determined by the size of the lumber-pile and its roof or cover, and I wish it understood that, while I have illustrated and described a bifurcated brace for holding down the roof or cover of a lumber-pile, I am well aware that its bifurcation is not altogether required, as a brace may be made from a single rod of iron provided with a hook on its lower end and curve on its upper end, including the remainder of my invention, and have substantially the same effect.

What I claim, and desire to secure by Letters Patent, is—

In a roof or cover fastening device for lumber-piles, the combination of a bifurcated brace with the hook provided on the lower end, and the curved hook on its upper end, the cross-bar that connects the prongs at the upper end and forms the square corners the dog and its curved handle, the said dog journaled to the said brace at the cross-bar F, substantially as and for the purpose set forth.

In testimony whereof I affix my signature in presence of two witnesses.

DUANE L. ZACH.

Witnesses:
 ADA WATERS,
 G. R. MONKS, Jr.